United States Patent [19]

Santos et al.

[11] Patent Number: 4,875,785
[45] Date of Patent: Oct. 24, 1989

[54] THRUST BEARING WITH A MAGNETIC FIELD DETECTOR

[75] Inventors: Alfred J. Santos, Canton; Frederick A. Cook, Jr., West Hartford; Scott M. Duncan, Avon; John Moseley, Norfolk, all of Conn.

[73] Assignee: The Torrington Company, Torrington, Conn.

[21] Appl. No.: 325,035

[22] Filed: Feb. 23, 1989

Related U.S. Application Data

[63] Continuation of Ser. No. 120,406, Nov. 13, 1987, abandoned.

[51] Int. Cl.$^4$ ............................................. F16C 19/30
[52] U.S. Cl. ..................................... 384/448; 384/446; 384/618
[58] Field of Search ............... 384/446, 448, 590, 609, 384/618, 619–622, 624; 324/174, 166, 207, 208; 310/155, 168, 90

[56] References Cited

U.S. PATENT DOCUMENTS

| | | | |
|---|---|---|---|
| 2,908,541 | 10/1959 | Fomenko | 384/609 X |
| 3,716,788 | 2/1973 | Nishida | 324/174 |
| 3,742,243 | 6/1973 | Gamble | 324/174 X |
| 3,826,933 | 7/1974 | Anselmino | 384/448 X |
| 3,930,694 | 1/1976 | Acker et al. | 384/609 |
| 4,069,435 | 1/1978 | Wannerskog et al. | 384/446 X |
| 4,167,734 | 9/1979 | Logan et al. | 384/624 X |
| 4,539,497 | 9/1985 | Boyer | 310/90 |
| 4,555,685 | 11/1985 | Maruyama | 310/168 X |
| 4,646,088 | 2/1987 | Inoue | 324/207 X |
| 4,688,951 | 8/1987 | Guers | 384/446 |
| 4,732,494 | 3/1988 | Guers et al. | 384/448 |

FOREIGN PATENT DOCUMENTS 0157514  8/1985  Japan ................................. 384/448

Primary Examiner—Thomas R. Hannon
Attorney, Agent, or Firm—Frank S. Troidl

[57] ABSTRACT

A permanently magnetized magnet associated with the bearing provides a magnetic field which is detected by a detector in the bearing. The relative rotation of one part of the bearing, such as a rotatable shaft or rotatable race, with respect to a second part of the bearing, such as a race, is indicated by the detector.

7 Claims, 3 Drawing Sheets

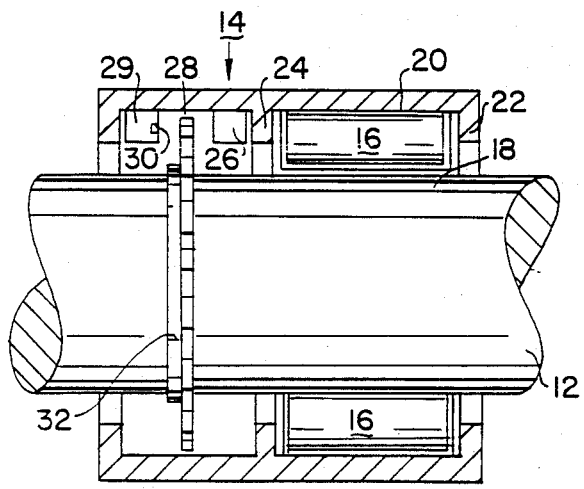
FIG. 1
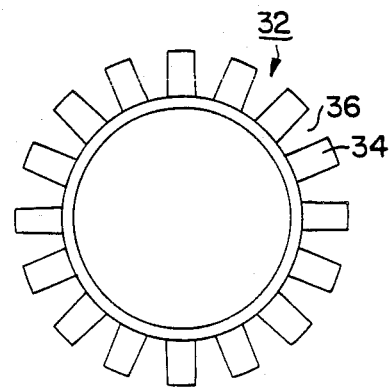
FIG. 2
FIG. 3
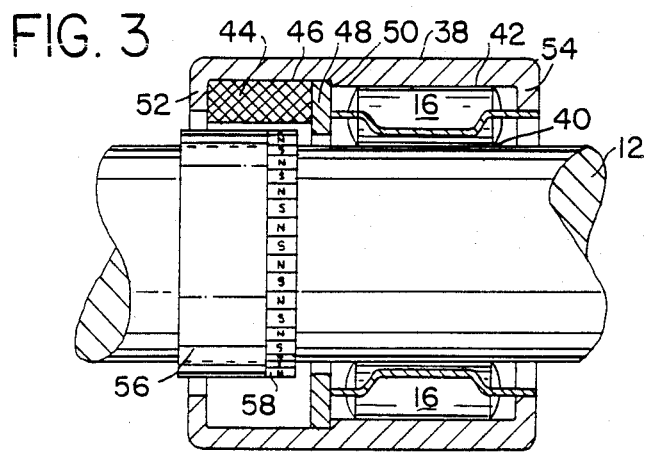
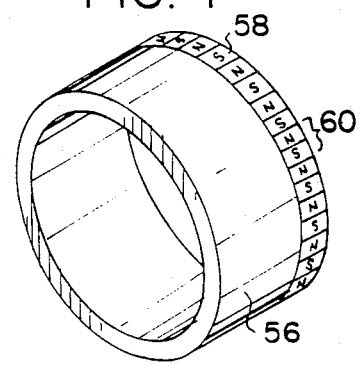
FIG. 4
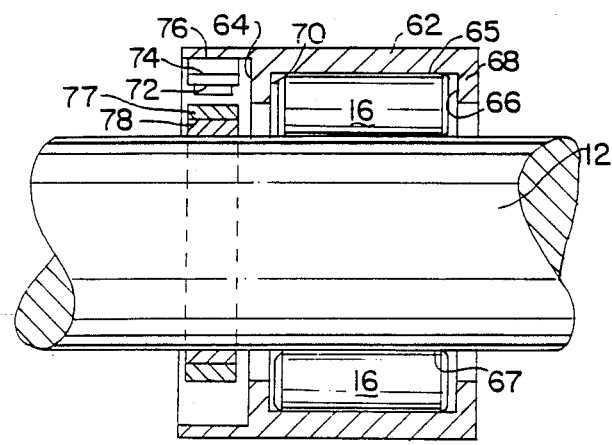
FIG. 5
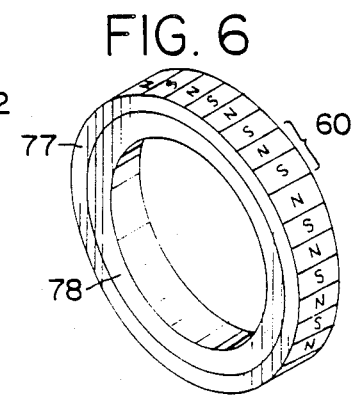
FIG. 6

THRUST BEARING WITH A MAGNETIC FIELD DETECTOR

This application is a continuation of application Ser. No. 120,406, filed Nov. 13, 1987, now abandoned.

BACKGROUND OF THE INVENTION

This invention relates to bearings. More particularly, this invention is a bearing of the type which has one or more magnetic field detectors for indicating the angular rotation of one member with respect to a second member.

Currently, various detectors such as inductive pick up or variable reluctance detectors are used to detect position, velocity or acceleration signals for rotating elements. These detectors typically measure the change in magnetic field strength as a ferro-magnetic rotor or gear tooth pass the detector. The frequency of the detector signal is used to calculate the rotational speed of the rotating member. These detectors have been added to bearing assemblies in an attempt to save space, increase precision and simplify installation.

In U.S. Pat. No. 3,716,788 to Nishida, a variable reluctance detector is added to a wheel bearing assembly to measure axle speed. A toothed rotor is formed on a revolvable inner bearing ring opposite a toothed stator fixed to the stationary outer bearing ring. The bearing outer ring also supports the magnetic coil pickup which produces a voltage in accordance with the changes in magnetic flux induced by alignment of the rotor and stator teeth during rotation. The frequency of the alternating current produced is in proportion to the rotational speed of the axle. A similar type speed detector is disclosed in U.S. Pat. No. 3,826,933 to Anselmino. The speed detector has a magnetic pickup coil secured to the stationary ring of a bearing while a wheel having ferromagnetic teeth is secured to the rotatable ring of the roller bearing.

U.S. Pat. No. 4,069,435 to Wannerskog discloses a device for detecting the relative motion in a bearing. The device includes a magnetic pickup coil mounted on the non-rotating outer ring seal of a bearing. A toothed wheel is mounted on the rotating ring of the bearing. As the teeth rotate, the variations in the magnetic field are detected by the magnetic coil pickup. The frequency of the detected variations can be used to calculate velocity and acceleration.

In U.S. Pat. No. 4,688,951 to Guers an electric current is required to create a magnetic field. A complicated electrical system is fixed to one of the two bearing races for creating the magnetic field. The known detector devices described above have many deficiencies. The variance reluctance detectors produce a voltage output signal whose frequency and amplitude are proportional to the speed. At low speeds, the output signal is weak and subject to inaccuracy. Furthermore, when the above detectors are added to bearing assemblies, the assembly size increases due to the additional detector components. The mechanical precision and signal accuracy decreases due to tolerance stack-up, and the overall construction becomes more complex. Also, the assemblies are difficult to install and sometimes require separate mounting steps to install the detector.

New automatic control systems, automotive, for example, require precise rotational speed measurement over complete operating ranges, especially at low speeds or zero speeds. Preferably the speed detectors are also low cost, reliable, compact in construction and easy to install.

SUMMARY OF THE INVENTION

This invention is a bearing with a magnetic field detecting means which may be one or more detectors. The bearing is permanently provided with a magnetic field. The magnetic field permanently exists at any relative rotation of one member with respect to another member, even zero relative rotation. This results in a much simpler and cheaper bearing than other bearings which include magnetic field detectors but require an electric circuit to create the magnetic field such as the bearing disclosed in the Guers U.S. Pat. No. 4,688,951.

Briefly described, this invention is a combination of parts comprising a first member and a second member relatively rotatable with respect to the first member. The combination includes means for permanently providing a magnetic field and means for detecting the magnetic field.

BRIEF DESCRIPTION OF THE DRAWINGS

The invention as well as its many advantages may be further understood by reference to the following detailed description and drawings in which:

FIG. 1 is a side elevational view, partly in section, of on embodiment of the invention;

FIG. 2 is a front view of the permeable annular member of FIG. 1;

FIG. 3 is a side elevational view, partly in section, of a second embodiment of the invention;

FIG. 4 is a perspective view of the press fit ring of FIG. 3;

FIG. 5 is a side elevational view, partly in section, of a third embodiment of the invention;

FIG. 6 is a perspective view of the magnetized ring of the embodiment of FIG. 5;

DETAILED DESCRIPTION OF THE PREFERRED EMBODIMENTS

Figure 7:
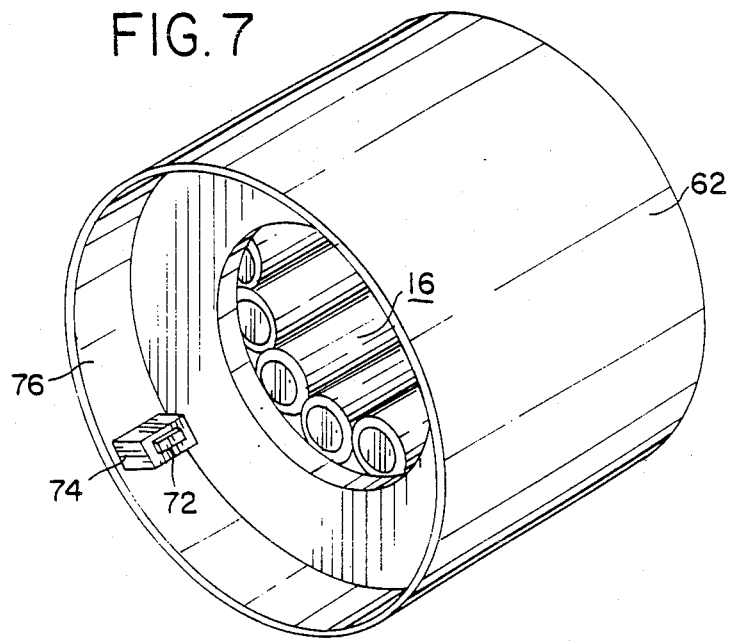
FIG. 7 is a perspective view of the outer race of the embodiment of FIG. 5.

In the various figures, like parts are referred to by like numbers.

Referring to the drawings and more particularly to FIG. 1, a rotatable shaft 12 extends through a coaxial annular race 14 radially spaced from the rotatable shaft 12. A plurality of rollers 16 are positioned in the annular space between the rotatable shaft and the coaxial annular race. The rollers roll about the rotatable shaft on an axial portion 18 of the rotatable shaft round surface. Axial portion 18 serves as a raceway on the rotatable shaft. The inner surface 20 of the coaxial annular race also serves as a roller raceway.

As used herein, and the appended claims, a "raceway" is intended to mean any surface along which a rolling member such as the rollers 16 roll.

The raceway 20 on annular race 14 is radially aligned and radially spaced from the raceway 18 on shaft 12. The rollers 16 are kept in their proper axial position on the raceways by the annular flange 22 and the annular flange 24 of the race.

A magnet 26 is mounted on the annular race 14 inside surface 28. The magnet is axially separated from the rollers by the annular flange 24. A magnetic field detector 30 such as a Hall effect, Wiegand effect, or a magnetoresistive detector is also mounted on detector mount 29 which is connected to the inside surface of the annular race. The magnetic field detector is axially aligned with and axially spaced from the magnet 26.

A permeable annular member 32 is rigidly mounted about the rotatable shaft 12. The permeable annular member extends radially between the permanent magnet 26 and the detector 30. The permeable annular member may, for example, be a vane interrupter (see FIG. 2) which is fixed to the rotatable shaft and rotates with the shaft.

Referring to FIG. 2, the vane interrupter 32 has a plurality of circumferentially equally spaced teeth 34, thus forming circumferentially equally spaced openings or grooves 36. The grooves are radially located to permit the magnetic path to pass from the magnet 26 through a groove to the detector 30, along the annular race 14 and back to the magnet when a groove is axially aligned with the magnet and the detector.

In operation, the magnet 26 provides a permanent magnetic field. The magnetic path normally follows a complete path through the detector 30 and the annular race 14 back to the magnet. However, as the vane interrupter 32 rotates, the teeth 34 shunt the magnetic path to the annular race 14 and back to the magnet without passing through the detector. The detector thus produces an interrupted signal representing incremental units of angular displacement of the shaft 12 with respect to the fixed annular race.

Depending on the signal conditioning electronic circuitry of the detector, the output signal can be analog or digital. Changes in absolute amplitude of the output signal indicates incremental units of angular displacement In the embodiment of FIG. 3, the rotatable shaft 12 is mounted within a coaxial annular race 38 with the rollers 16 adapted to roll within the annular space separating the raceway 40 on the rotatable shaft 12 and the raceway 42 on the inside surface of the race.

A detector 44 is mounted on the inside surface 46 of the race 38. The detector is kept axially in place by the washer 48 fitted against the annular shoulder 50, and the annular flange 52 on one end of the race 38. The rollers 16 are kept on the raceways 40 and 42 on rotatable shaft 12 and race 38, respectively, by the washer 48 and the annular flange 54 on the other end of the race 38.

The means for permanently providing a magnetic field is a permanently magnetized ferro-magnetic ring 56 which is press fit on the rotatable shaft 12. As used herein and in the appended claims, a "ferro-magnetic" material means a substance that once magnetized remains in a permanently magnetized condition in the absence of an external magnetic field. An axially extending portion 58 of the ferro-magnetic ring 56 is provided with a plurality of magnetic pole segments about its entire circumference. Each segment 60 has a North pole and South pole. The segments are arranged so that each North pole is between two South poles and each South pole is between two North poles.

In the embodiment of FIG. 5 the rotatable shaft 12 is mounted within an annular race 62 having a counterbore 64. Rollers 16 are axially kept within the raceways 65 and 67 on the annular race and rotatable shaft, respectively, by the annular shoulder 66 formed by annular flange 68 adjacent one axial end of the rollers and the annular shoulder 70 adjacent the other axial end of the rollers.

A detector 72 is mounted on a detector mount 74 which is fixed to and protrudes radially from the inside annular surface 76 of the counterbore 64.

The means for permanently providing a magnetic field is a ferro-magnetic annular ring 77 mounted on the rotatable shaft 12 by means of an annular ring mount 78. The ferro-magnetic ring 77 is permanently magnetized to have a plurality of magnetic pole segments 60 about its entire circumference. Each segment has a North pole and a South pole.

The segments are arranged so each North pole is between two South poles and each South pole is between two North poles.

Figure 8:
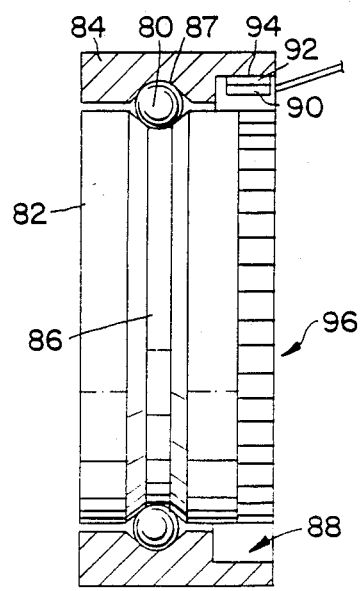
FIG. 8 is a side elevational view, partly in section, of a fourth embodiment of the invention.

In the embodiment shown in FIG. 8 instead of rollers, the rolling members are balls 80 and instead of one of the raceways for the balls 80 being provided by a rotating shaft, one of the raceways is provided by an annular inner race 82. A coaxial annular outer race 84 is radially spaced from the annular inner race 82. The raceways for the balls 80 are provided by a circumferential groove 86 on the annular inner race 82 and a circumferential groove 87 in the inside surface of the coaxial annular outer race 84.

A counterbore 88 extends from one axial end of annular outer race 84. A detector 90 is mounted on a detector mount 92 fixed to and extending radially inwardly from the axially extending inside surface 94 of the counterbore 88.

A longitudinally extending portion 96 of the annular inner race 82 is permanently magnetized about its entire circumference with a predetermined magnetic pattern.

The magnetic pattern is the same as the magnetic pattern on the magnetic field providing portions of the previous embodiments described.

Figure 10:
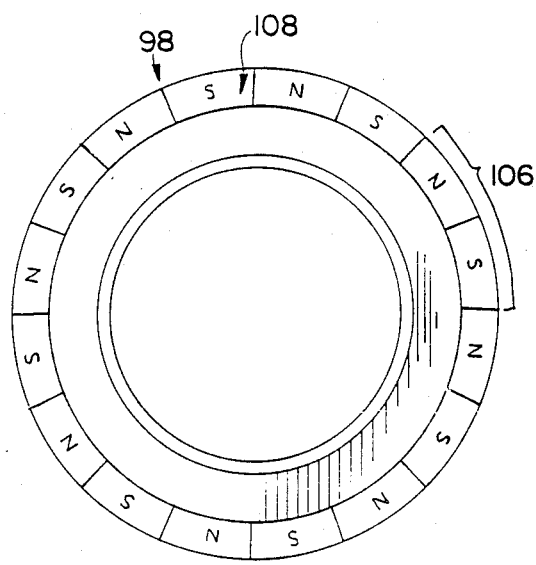
FIG. 10 is a front view of the permanently magnetized thrust plate of FIG. 9.
Figure 9:
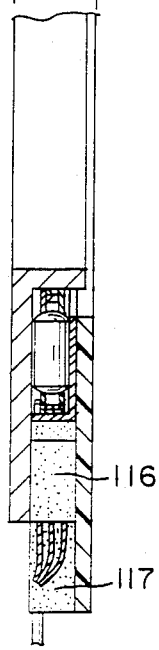
FIG. 9 is a side elevational sectional view of a fifth embodiment of the invention.
Figure 11:
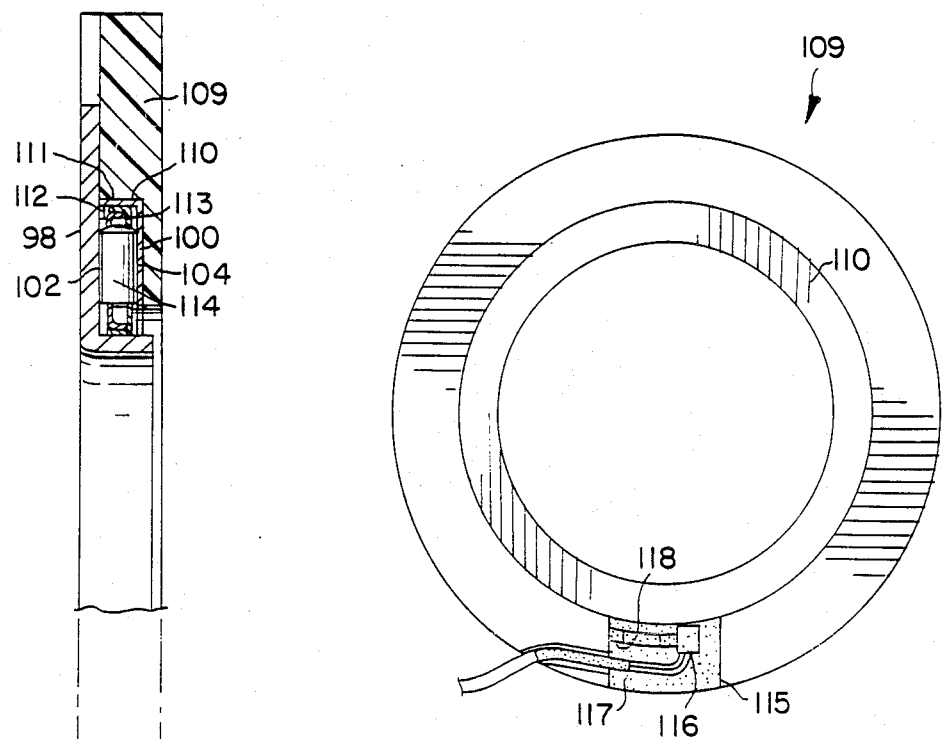
FIG. 11 is a front view of the thrust plate of FIG. 9 on which the magnetic field detector is mounted.

FIGS. 9, 10 and 11 show a thrust bearing with a first annular thrust plate 98 and second annular thrust plate 100 axially spaced from the first annular thrust plate. The radially extending roller raceway 102 on the annular thrust plate 98 and the radially extending roller raceway 104 of the annular thrust plate 100 face one another. The means for permanently providing a magnetic field are a plurality of permanently magnetized magnetic pole segments 106 (see FIG. 10). The magnetic pole segments are arranged in a pattern about the entire circumference of a radial portion 108 of the thrust plate 98. As shown in FIG. 10, each segment 106 has a North pole and a South pole with the segments being arranged so that each North pole is between two South poles and each South pole is between two North poles.

An annular plastic detector support 109 has a counterbore 110 in which the thrust plate 100 is placed. The edge portion of the outer peripheral wall 111 is formed into a restraining portion 112 inwardly extending beyond the outer peripheral edge of a roller cage 113 containing rollers 114.

A groove 115 extends from the outer periphery of the detector support 109 to the counterbore 110 (see FIG. 11). The means for detecting the magnetic field is a detector 116 mounted by resin 117 within the groove 115 in close proximity to the magnetic pole pattern on the thrust plate 98. An optional magnetic flux concentrator 118 (see FIG. 11) may be positioned circumferentially adjacent to detector 116. The flux concentrator helps complete the magnetic circuit from one alternating pair of poles on the rotating ring to the detector on the stationary ring. Thus, when the detector 116 is centered over one magnetic pole segment the flux concentrator 118 centered over an adjacent and opposite polarity magnetic pole segment to provide a complete magnetic flux path.

In the operation of all the embodiments of FIG. 3 through FIG. 11, as each alternating polarity segment passes the detector, the polarity and strength of the magnetic field causes the detector to produce electric signals.

This voltage signal can be further processed by circuits to produce an output signal indicating an incremental unit of angular displacement. The incremental angular displacement unit is equal to the number of degrees of arc in each pole segment. The use of magnetic field strength detectors in the present invention produces a consistent signal at all speeds, even zero speed.

Depending on the signal conditioning electronic circuitry of the detector, the output signal can be an analog or digital signal. Changes in magnitude of the output signal indicate incremental angular displacement. The angudisplacement output signal can be further processed by integrated circuitry in the detector to generate a position signal, a speed signal or an acceleration signal.

Integrating a magnetic pattern into a rotating member to indicate incremental angular movement eliminates the need to add a separate indicator component to the bearing.

Magnetizing the rotating member into a large number of segments also allows very high resolution.

By providing the magnetized pattern on the rotating member and mounting the detector into the stationary member results in the bearing tolerances controlling the detector precision. Using bearing tolerances allows a minimal detector-target air gap. The construction of the present invention thus minimizes detector signal distortion and inaccuracy.

Though the embodiments described in detail herein include rolling elements, the invention may also be used in bearings which do not contain rolling elements. All that is required is that there be a pair of bearing members with one bearing member being relatively rotatable with respect to the other bearing member. In addition, a means must be included for permanently providing a magnetic field and, of course, at least one detector for detecting magnetic flux must be included. Thus, journal bearings without rolling elements would be included within the scope of this invention.

The embodiment of FIG. 8 has a rotatable inner race and a fixed outer race. However, if desired, the detector could be placed on a fixed inner race and the magnetized pattern integrated on a rotatable outer race. Also, though all the embodiments are described as having a fixed member and a rotatable member, both members could be rotatable members and the rotation of one member with respect to the other member indicated.

In all the embodiments described, the magnetized pattern is on a rotating member and the detector is mounted on a fixed member. The advantage of this arrangement is that there are no wires and no electronic circuitry on the rotating member. However, where wires and electronic circuitry on the rotating member is no problem, the magnetic pattern may be integrated on the fixed member and the detector mounted on the rotating member.

We claim:

1. A thrust bearing comprising: a first thrust plate; a second thrust plate relatively rotatable with respect to the first thrust plate; means on the first thrust plate for permanently providing a magnetic field; an annular detector support; and at least one detector on the annular detector support for detecting the magnetic field.

2. The thrust bearing of claim 1 wherein: the means for detecting the magnetic field is a Hall-effect detector.

3. The thrust bearing of claim 1 wherein: the means for permanently providing a magnetic field is at least one pair of magnetic poles of opposite signs.

4. The thrust bearing comprising: a first thrust plate having an annular rolling member raceway; a second thrust plate axially spaced from the first thrust plate and having an annular rolling member raceway aligned with and spaced from the first thrust plate raceway, and relatively rotatable with respect to the first thrust plate; rolling members in the space between said raceways; means on the first thrust plate for permanently providing a magnetic field; an annular detector support; and at least one detector on the annular detector support for detecting the magnetic field.

5. A thrust bearing in accordance with claim 4 wherein: the first and second thrust plates are annular; and the means for permanently providing a magnetic field are a plurality of permanently magnetized magnetic pole segments about the entire circumference of a radial portion of the first thrust plate.

6. In combination: first and second annular thrust plates relatively rotatable with respect to one another; a plurality of permanently magnetized magnetic pole segments about the entire circumference of a radial portion of the first thrust plate, each segment having a North pole and a South pole, with the segments being arranged so that each pole is between two poles of opposite polarity; and an annular member having a radial surface facing the permanently magnetized magnetic pole segments on the first thrust plate; and at least one magnetic field detector mounted on said radial surface of the annular member facing said permanently magnetized magnetic pole segments.

7. In combination: first and second annular thrust plates relatively rotatable with respect to one another with axially aligned spaced roller raceways; rollers in the space between the raceways; a plurality of permanently magnetized magnetic pole segments about the entire circumference of a radial portion of the first thrust plate, each segment having a North pole and a South pole, with the segments being arranged so that each pole is between two poles of opposite polarity; an annular member having a radial surface facing the permanently magnetized magnetic pole segments on the first thrust plate; and at least one magnetic field detector mounted on said radial surface of the annular member facing said permanently magnetized magnetic pole segments.

* * * * *